Sept. 30, 1952            J. HERNDON            2,611,960
SHOCK ABSORBING MEANS FOR POWER-DRIVEN HAND TOOLS
Filed Oct. 25, 1949            2 SHEETS—SHEET 1
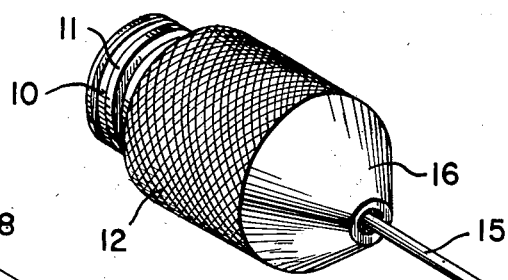
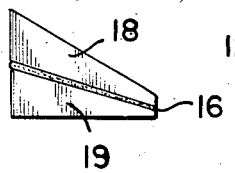
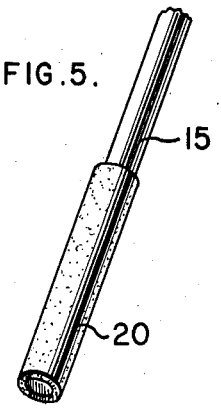
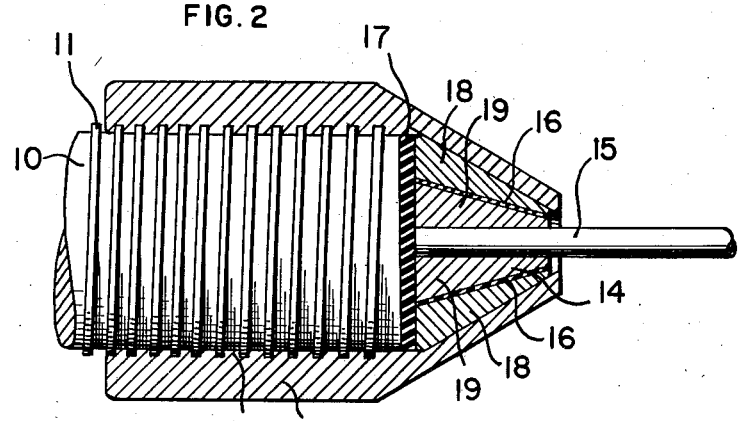
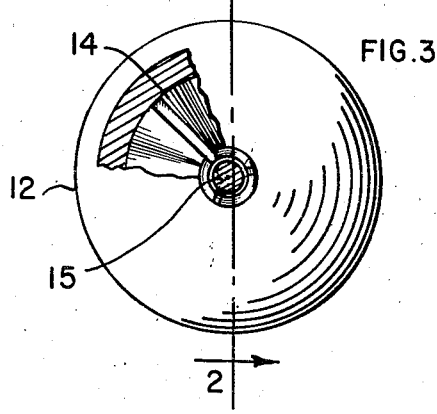
INVENTOR.
Julian Herndon Sept. 30, 1952 J. HERNDON 2,611,960
SHOCK ABSORBING MEANS FOR POWER-DRIVEN HAND TOOLS
Filed Oct. 25, 1949 2 SHEETS—SHEET 2
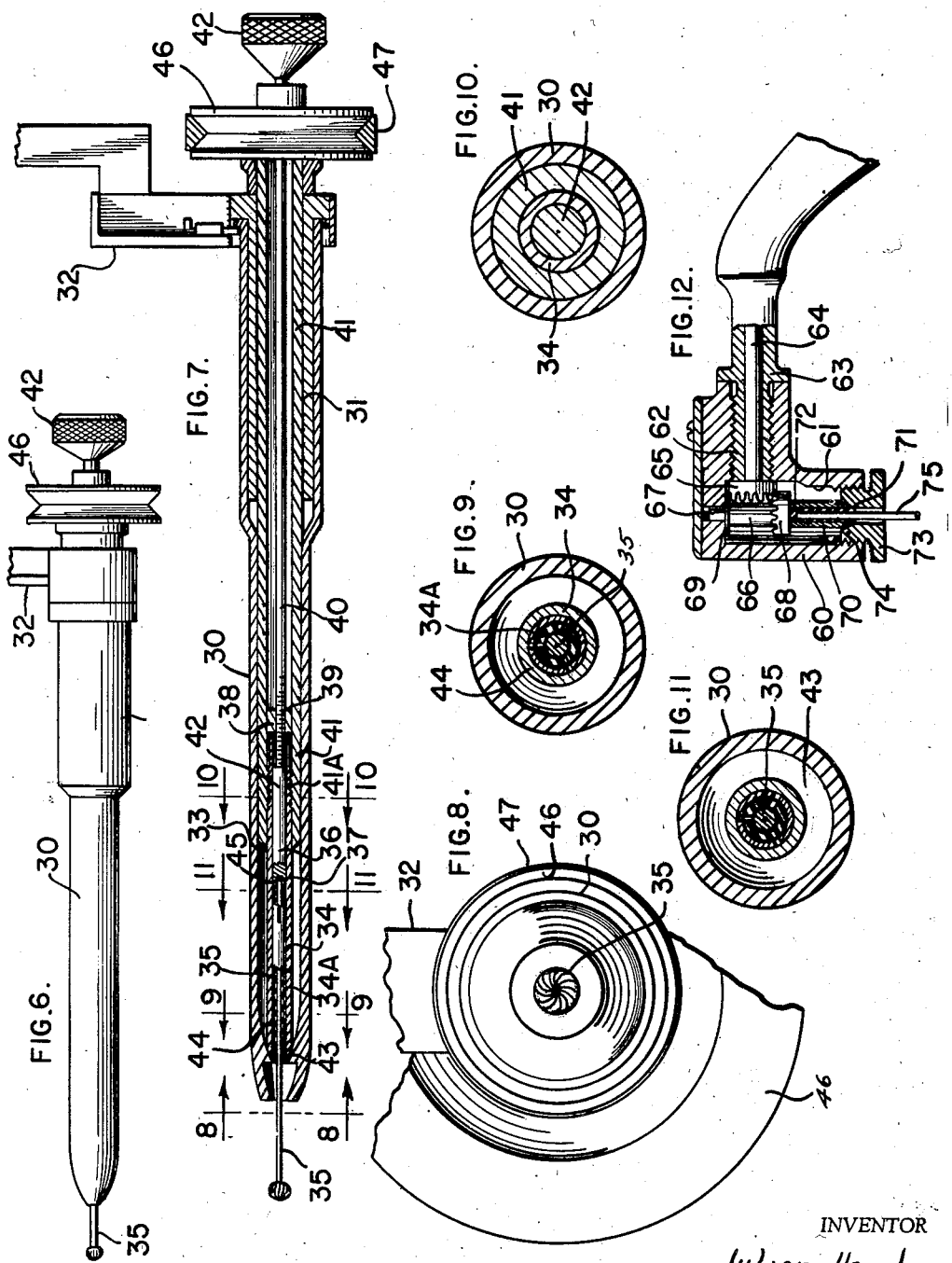
INVENTOR
Julian Herndon
BY Patented Sept. 30, 1952

2,611,960

UNITED STATES PATENT OFFICE 2,611,960

SHOCK ABSORBING MEANS FOR POWER-DRIVEN HAND TOOLS

Julian Herndon, Leesburg, Fla.

Application October 25, 1949, Serial No. 123,465

4 Claims. (Cl. 32—26)

The present invention relates to means for relieving or absorbing shock in power driven hand tools by breaking the direct transmission of the force through the absorbing means, and more particularly is directed to such means used in connection with electric drills, air drills, dental drills, and the like.

With the present invention, no material alteration is required in the adaption of the inventive concept to conventional hand power tools of the type under consideration, with the exception of the chuck. Broadly, the invention comprises incorporating a resilient core of the proper density with the chuck fingers, the rubber acting as an insulation from the mechanical impulses, whereby shock from the incessant vibrations of the drill to the operator's nerves is materially lessened and in the case of dental drills, the noise and shock is lessened to the patient. In connection with delicate drills, the rubber or resilient element will be softer, while in heavier drills, the best results are accomplished by a more dense, harder, less resilient substance.

An object of the present invention is to provide a means of absorbing the shock or vibration of tools of the type under consideration which may be easily and readily installed in conventional equipment of this character.

Another object is to provide means for absorbing the shock or vibration of power driven hand tools which is simple in structural detail, positive and efficient in operation, and capable of being readily and inexpensively manufactured.

And another object of the invention is to provide a means of relieving or absorbing shock in power driven hand tools by breaking or eliminating the direct transmission of force through the medium of a resilient material incorporated in the tool.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in perspective of a conventional drill employing the present invention.

Figure 2 is a longitudinal sectional view taken along the line 2—2 of Figure 3, the view looking in the direction of the arrows.

Figure 3 is an end view of the tool shown in Figures 1 and 2.

Figure 4 is an elevation of a chuck finger.

Figure 5 is a cross section and an end view of a drill bit.

Figure 6 is an elevational view of a modified form of the device applied to a dental drill.

Figure 7 is a longitudinal vertical sectional view of the drill shown in Figure 6.

Figure 8 is a view taken along the line 8—8 of Figure 7, looking in the direction of the arrows, but being on a slightly enlarged scale.

Figure 9 is a sectional view taken along the line 9—9 of Figure 7, looking in the direction of the arrows, but being on a slightly enlarged scale.

Figure 10 is a sectional view taken along the line 10—10 of Figure 7, looking in the direction of the arrows, but being on a slightly enlarged scale.

Figure 11 is a sectional view taken along the line 11—11 of Figure 7, looking in the direction of the arrows, but being on a slightly enlarged scale.

Figure 12 is a vertical sectional view of a further modified form of the invention for dental drill extensions wherein the burr or drill bit is held at right angles to the hand piece.

Referring to the drawings, and more particularly Figure 2, a drill stock 10 having external threads 11 is equipped with a tightening sleeve 12 provided with internal threads 13 which cooperate with the external threads 11 for the usual purpose. Chuck fingers 14 of metal are located within the sleeve 12, and the fingers are adapted to contact drill 15 at its shank end. Of course the rotation of the sleeve 12 will either tighten or loosen the pressure of the fingers 14 on the drill.

Resilient cores 16 are introduced between sections 18 and 19 of the chuck fingers 14 to function as an insulation separating the outer and inner sections 18 and 19 of each finger thereby breaking the direct metallic transmission of power. The absorption of shock is further accomplished by locating a disc 17 of rubber or other resilient material between the drill stock 10 and the base of the chuck fingers. The disc may be attached in any convenient manner to the fingers. The shank of the drill bit 15 rests against the disc 17, thus completing the insulation of the drill. The composition, density and resiliency of the cores 16 and the disc 17 are governed by the purpose for which the drill is to be employed.

It is also possible, without alteration to the chuck, to accomplish satisfactory results by placing a resilient sleeve 20 over the shank of the drill 15 in order that the chuck fingers in their clamping position will engage the rubber sleeve, as shown in Figure 5. While this will effectively absorb the shock, the rubber sleeve will be subjected to considerable wear and with the attendant replacement problem.

It will be appreciated, therefore, that I have provided a very simple means for relieving or absorbing shock occasioned by tools of the character under discussion, which means may be easily installed in conventional power hand tools. The absorbing unit by virtue of its simplicity does not increase appreciably the cost of the hand tool which, of course, is highly desirable.

In Figure 6, the invention is illustrated in connection with a dental drill wherein the numeral 30 denotes the outer housing which fits over a sleeve 31 carried by a bracket 32, such as employed in dentistry. The housing 30 is provided adjacent the outer open end with an internal tapered flange 33, and a tubular member 41 extends longitudinally of the housing and is provided with a nut 38 adjacent its outer end. An adjusting screw 40 projects through the member 41 and threads 39 engage the nut 38 and the free end of the tightening screw 40 may be provided with a knurled operating head 42. A metal sleeve 34 threadedly engages the tubular member 41, as shown at 41A and a cylindrical chuck 34A is located within the sleeve 34 adjacent the forward end thereof, and a plunger 36 is also located within the sleeve 34 rearwardly of the chuck 34A. The outer end of the plunger 36 is formed with a recess 37 which is adapted to engage the end of the chuck, as will later be more fully described. The shank of a drill or burr 35 is adapted to be held by the chuck 34A.

As above indicated, the chuck 34A is of the cylindrical type and each end thereof is tapered, as shown at 43, and the inner circumference of the chuck is provided with a resilient lining 44 in order to insulate the drill shank from the chuck. The base of the recess 37 is also provided with a resilient member 45 and hence, it can be seen that the drill is entirely insulated from the drill body.

Assuming that the drill shank is inserted within the chuck 34A, by turning the knurled head 42, the screw 40 will move the plunger 36 forwardly and as the recess 37 engages the outer tapered end 43 of the chuck, the chuck will clamp the shank, and as the plunger continues to move forward, the forward end of the sleeve 34 will cause the opposite end 43 of the chuck to clamp or grip the shank in a firm, secure manner and, of course, the resilient members 44 and 45 will positively insulate the shank from the drill assembly.

A pulley or the like 46 is operatively associated with the member 41 and a belt 47 trained around the pulley is employed for imparting the necessary rotary movement to the drill or burr 35.

It is believed, therefore, that this arrangement may be readily incorporated within dental drills such as are currently employed, and requires little or no alteration of the dental equipment. It is, of course, quite simple both in structural detail and in operation and is highly effective in absorbing the vibrations of the drill or burr.

With reference to Figure 12, there is shown an extension for holding the dental burr at right angles to the hand piece and it comprises a body 60 having an opening 61 therein and a threaded opening 62 at right angles thereto for threadedly receiving fitting 63 supporting a driving shaft 64 which terminates in gear 65. A rotatable element 66 is disposed within the recess 61 at right angles to the gear 65 and is formed with a reduced portion 67 at the upper end thereof which is journaled in the body 60. A gear 68 is carried by the rotatable element 66, and an annular member 69 is formed on the rotatable element in spaced relationship to the gear 68. The distance between the member 69 and the gear 68 is such as to accommodate the gear 65 which meshes with the gear 68 to keep the respective gear elements in mesh.

A cylindrical chuck 70 extends downwardly from the rotatable element 68 and is slotted longitudinally as is conventional practice in chucks of this nature. The inner surface of the chuck 70 is provided with a resilient lining 71, and a resilient element 72 is also provided at the base of the chuck.

A nut 73 engages threads provided along the lower portion of the recess 61 and the nut is formed with a conical seat 74 the taper of which substantially coincides with that of the end of the chuck. After the shank of a drill or burr 75 is inserted within the chuck 70, the nut is drawn up, whereby the tapered seat will force the chuck to grasp and hold the drill shank firmly. By virtue of the resilient elements 71 and 72, it can be seen that the drill is properly fully insulated from the metal parts of the equipment.

The invention is not to be confined to any strict conformity with the showing in the drawing, but may be changed or modified so long as such changes or modifications mark no material departure from the salient features of the invention as expressed in the appended claims.

I claim:

1. A drill assembly comprising chuck fingers a drill bit adapted to be engaged by the chuck fingers, a stock, an actuating sleeve rotatably mounted on the stock, the movement of the sleeve being adapted to actuate the chuck fingers, each of said chuck fingers including an outer section and an inner section, the outer section bearing against the sleeve and the inner section engaging the drill bit, and a resilient core interposed between said outer and inner sections to break the direct metallic pulsations transmitted to the operator.

2. A drill as claimed in claim 1 wherein a resilient disc is interposed between the base of the chuck fingers and the stock to insulate the drill bit and chuck fingers from the stock.

3. A drill as claimed in claim 2 wherein the resilient disc is secured to the base of the chuck fingers.

4. A drill as claimed in claim 1 wherein the drill bit is provided with a resilient sleeve.

JULIAN HERNDON.

REFERENCES CITED

The following references are of record in the file of this patent:

UNITED STATES PATENTS

| Number | Name | Date |
|---|---|---|
| 1,685,670 | Evslin | Sept. 25, 1928 |
| 2,310,409 | Ellman | Feb. 9, 1943 |
| 2,346,706 | Stoner | Apr. 18, 1944 |
| 2,346,707 | Stoner | Apr. 18, 1944 |

FOREIGN PATENTS

| Number | Country | Date |
|---|---|---|
| 540,158 | Germany | Dec. 8, 1931 |